June 26, 1928.
H. W. PAYNE
INDICATOR AND RECORDER
Filed Nov. 29, 1927
1,674,792
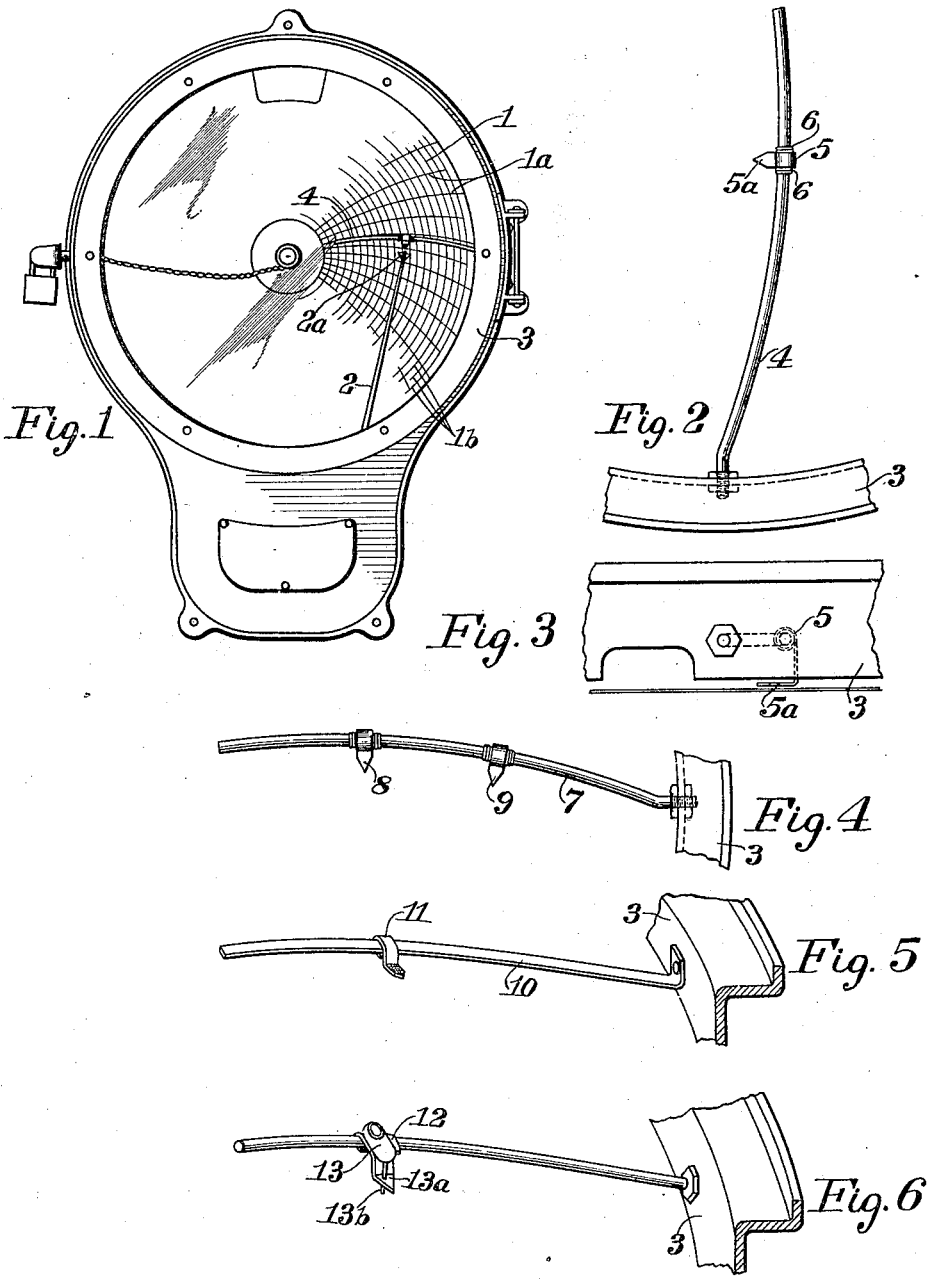
INVENTOR:
Hugh W. Payne
BY Alfred Burger
his ATTORNEY.

Patented June 26, 1928.

1,674,792

UNITED STATES PATENT OFFICE.

HUGH W. PAYNE, OF TORONTO, ONTARIO, CANADA, ASSIGNOR TO TAYLOR INSTRUMENT COMPANIES, OF ROCHESTER, NEW YORK, A CORPORATION OF NEW YORK.

INDICATOR AND RECORDER.

Application filed November 29, 1927. Serial No. 236,431.

This invention relates to an improvement in indicators and recorders.

Instruments of the class referred to usually have a chart, scale or dial graduated in suitable units of measurement and a pointer or index for co-operation therewith.

Heretofore, it has been necessary for taking a reading to get close to a chart to clearly observe the precise position of the pointer. This is particularly true in connection with charts having many lines. In most cases of practical application, the attendant is not so much interested in the actual reading as rather in the question whether a pointer is at a particular point or how far it is on one side or the other of such point. For the sake of expedience it was current practice to draw one of the lines, let us call it a critical line, heavier so as to facilitate the observation of its position relatively to the pointer or vice versa.

It is the object of the present invention to provide means for more expeditiously reading charts, dials and scales.

In order to more fully explain the invention, its scope and its application, reference is made to the accompanying drawings, wherein—

Fig. 1 is a face view of a conventional type of recorder embodying the invention;

Fig. 2 is a fragmentary face view on a larger scale showing the invention;

Fig. 3 is a side view thereof; and

Fig. 4 is a face view showing a modification of the form shown in Figs. 2 and 3.

Fig. 5 is a fragmentary perspective view of another form; and

Fig. 6 is a fragmentary perspective view of still another form.

While the invention is of more general application, I have shown it as applied to a recorder having a rotary chart. In the drawings the chart 1, which is mounted for rotation upon a central arbre driven by a time piece as is usual, represents a usual form of temperature chart whereon the radially curved lines $1^a$ indicate units of time while the circumferential lines $1^b$ concentric with the arbre represent units of temperature. The pen arm 2, which in its broader aspect is an indicator, is supported on a pivot so that its extremity or the pen $2^a$ more in particular, has movement parallel to the radially curved lines $1^a$ as they successively come under the nib of the pen or the stylus as the case may be.

On the casing 3 I have mounted a rod 4 preferably curved to coincide with the radially curved lines $1^a$ as they pass under it. Having reference to Figs. 1–3, the rod 4 is a support for an index element mounted for movement thereon. In the particular instance, the index element comprises a carriage 5 adapted to slide along the rod 4 and an index point $5^a$ moving close to the surface of the chart 1.

It is, of course, desirable and, from a practical point of view, necessary that the carriage should be easy to move but remain stationary in adjusted position. To this end many detail constructions are available. For the sake of example I have associated with the carriage 5 spring wire coils 6 which readily yield to pressure by hand and yet grip the rod 4 sufficiently tightly to hold the carriage against creeping movement such as might be induced by vibrations or other forces.

In practice, the carriage is moved so that the index point $5^a$ indicates a critical point on the chart or scale which is of special interest to the attendant and the relation of which to the pointer or pen arm 2 is to be frequently watched. It is then exceedingly easy to determine at a glance and from almost any reasonable distance whether the pen arm and the index point are in alignment or whether and how much the pen or other indicator is to one side or the other side of the critical point on the chart.

While it was heretofore necessary to specially print charts, which were otherwise identical, with different heavy lines to suit special cases, such special printing is obviated by my arrangement, aside entirely from the fact that my arrangement is more effective for the purpose in question. All charts may be alike and the index point $5^a$ may be set at any point on the chart and may be varied from time to time as desired.

In some instances, as for instance in connection with wet and dry bulb thermometers, two indicators co-operate with the same chart, wherefore there may be two points of special interest on the chart. In such cases two index points 8 and 9 may be mounted on the same rod 7, as indicated in Fig. 4.

In fact, any number of index points might be associated with each other, dependently or independently, on the same rod to provide for all possible conditions and requirements.

The attachment comprising the rod, carriage and index point may be made of metal to provide a rugged structure or it may be made of celluloid or the like as desired. In the latter case, a more careful handling is required for making adjustments. The latter arrangement, however, has certain advantages.

As seen from Fig. 5, the arm 10 may be made of flat stock of celluloid or other similar material and the carriage 11 of like material may be so fitted on it as to provide the desired amount of frictional resistance. The arm 10 may be so attached to the casing 3 that the flat surface is parallel to the chart and close thereto and preferably so that the carriage comes to rest upon the chart.

While the arm and the carriage may be transparent, the index point may be provided with a coat of black or other color suitable for the purpose of demarkation.

In the foregoing I have made reference to the movable index point as means for indicating a point on a chart. It is to be understood, however, that the movable index point may have the form of a stylus or pen for simultaneously tracing a record. Thus in Fig. 6, the carriage 12 carries an element 13 which defines an index point 13$^a$ to co-operate with the pointer of the instrument and a pen 13$^b$ for tracing contact with the record chart.

Aside from performing the function of an index point as previously described, a record may be formed for inspection as a check-up on operators and their compliance with instructions.

I claim:

1. In apparatus of the character described, the combination with a rotary chart having radially curved lines and lines concentric with the center of rotation of the chart and a pointer co-operating with the chart, of an arm corresponding in shape and extent to said radially curved lines, mounted in superposition therewith, and a member providing an index point mounted for movement on the arm in the direction of length thereof.

2. In apparatus of the character described, the combination with a rotary chart having radially curved lines and lines concentric with the center of rotation of the chart and a pointer co-operating with the chart, of an arm corresponding in shape and extent to said radially curved lines, mounted in superposition therewith and a member providing an index point mounted for movement on the arm in the direction of length thereof and means on the arm and the said member for frictionally holding them in any relative position.

In testimony whereof I affix my signature.

HUGH W. PAYNE.